(12) United States Patent
Lannutti et al.

(10) Patent No.: US 8,784,244 B2
(45) Date of Patent: Jul. 22, 2014

(54) PULLEY WITH ASYMMETRIC TORQUE-SENSITIVE CLUTCHING

(75) Inventors: Anthony E. Lannutti, Fayetteville, AR (US); Kevin Dutil, Bentonville, AR (US)

(73) Assignee: Dayco IP Holdings, LLC, Springfield, MO (US)

( * ) Notice: Subject to any disclaimer, the term of this patent is extended or adjusted under 35 U.S.C. 154(b) by 548 days.

(21) Appl. No.: 13/050,019

(22) Filed: Mar. 17, 2011

(65) Prior Publication Data

US 2011/0198185 A1 Aug. 18, 2011

Related U.S. Application Data

(63) Continuation-in-part of application No. 12/713,580, filed on Feb. 26, 2010, now Pat. No. 8,529,387, which is a continuation-in-part of application No. 12/112,393, filed on Apr. 30, 2008, now Pat. No. 7,931,552.

(51) Int. Cl.
| | |
|---|---|
| *F16H 9/00* | (2006.01) |
| *F16D 13/28* | (2006.01) |
| *F16D 41/22* | (2006.01) |
| *F16D 13/76* | (2006.01) |

(52) U.S. Cl.
CPC .............. *F16D 13/28* (2013.01); *F16D 41/22* (2013.01); *F16D 13/76* (2013.01)
USPC ............. 474/74; 474/73; 474/84; 192/113.32

(58) Field of Classification Search
CPC ................................ F16D 13/28; F16D 13/76
USPC .......... 474/73, 74, 32, 35, 84, 86, 70; 192/45, 192/110 B, 113.32, 41 S, 113.34
See application file for complete search history.

(56) References Cited

U.S. PATENT DOCUMENTS

| | | | |
|---|---|---|---|
| 2,499,219 | A | 2/1950 | Hemmeter |
| 4,483,430 | A | 11/1984 | Carmichael et al. |

(Continued)

FOREIGN PATENT DOCUMENTS

| | | |
|---|---|---|
| CN | 1490502 | 4/2004 |
| DE | 4300178 | 4/1994 |

(Continued)

OTHER PUBLICATIONS

PCT, International Search Report, International Application No. PCT/US2009/041573 (mailed Jun. 11, 2009; published Feb. 25, 2010).

(Continued)

*Primary Examiner* — Emmanuel M Marcelo
(74) *Attorney, Agent, or Firm* — Thompson Hine, L.L.P.

(57) ABSTRACT

A pulley assembly for an automobile accessory drive system includes a shaft engaging hub, a nut threaded onto the shaft engaging hub, an annular bushing, and one or more brake shoes positioned around the outside of the annular bushing all housed with a pulley member. The nut is capable of axial translation relative to the annular bushing and the annular bushing is capable of expanding radially outward in response to the axial translation of the nut in a first direction to provide frictional engagement between the inner coupling surface of the pulley member and the outer coupling surface of the brake shoes, which transfers torque from the pulley member to the input shaft. The nut includes a generally frustoconical outer surface, opposite its inner threaded surface, for seating the nut in the annular bushing.

20 Claims, 10 Drawing Sheets

(56) References Cited

U.S. PATENT DOCUMENTS

| | | | |
|---|---|---|---|
| 4,509,933 | A | 4/1985 | Miranti, Jr. et al. |
| 4,541,516 | A | 9/1985 | Fenzel |
| 4,583,962 | A | 4/1986 | Bytzek et al. |
| 4,596,538 | A | 6/1986 | Henderson |
| 4,661,087 | A | 4/1987 | Henderson |
| 4,662,861 | A | 5/1987 | Seung et al. |
| 4,698,049 | A | 10/1987 | Bytzek et al. |
| 4,822,322 | A | 4/1989 | Martin |
| 4,826,471 | A | 5/1989 | Ushio |
| 4,832,665 | A | 5/1989 | Kadota et al. |
| 4,869,353 | A | 9/1989 | Ohtsuki et al. |
| 4,878,885 | A | 11/1989 | Brandenstein et al. |
| 4,971,589 | A | 11/1990 | Sidwell et al. |
| 5,015,217 | A | 5/1991 | Henderson |
| 5,035,679 | A | 7/1991 | Green et al. |
| 5,057,059 | A | 10/1991 | Sidwell et al. |
| 5,096,035 | A | 3/1992 | Bradfield |
| 5,149,306 | A | 9/1992 | Sidwell et al. |
| 5,209,705 | A | 5/1993 | Gregg |
| 5,215,504 | A | 6/1993 | Wong et al. |
| 5,234,385 | A | 8/1993 | Kawashima et al. |
| 5,250,009 | A | 10/1993 | Sidwell et al. |
| 5,334,109 | A | 8/1994 | Izutsu et al. |
| 5,370,585 | A | 12/1994 | Thomey et al. |
| 5,382,198 | A | 1/1995 | Janne |
| 5,478,285 | A | 12/1995 | Bakker et al. |
| 5,558,370 | A | 9/1996 | Behr |
| 5,575,727 | A | 11/1996 | Gardner et al. |
| 5,598,913 | A | 2/1997 | Monahan et al. |
| 5,620,385 | A | 4/1997 | Cascionale et al. |
| 5,692,482 | A | 12/1997 | Shimizu et al. |
| 5,772,549 | A | 6/1998 | Berndt et al. |
| 5,795,257 | A | 8/1998 | Giese et al. |
| 5,803,850 | A | 9/1998 | Hong et al. |
| 5,827,143 | A | 10/1998 | Monahan et al. |
| 6,004,235 | A | 12/1999 | Ohta et al. |
| 6,044,943 | A | 4/2000 | Bytzek et al. |
| 6,083,130 | A | 7/2000 | Mevissen et al. |
| 6,161,841 | A | 12/2000 | Shaw |
| 6,193,040 | B1 | 2/2001 | Cerny |
| 6,217,470 | B1 | 4/2001 | Quintus |
| 6,231,465 | B1 | 5/2001 | Quintus |
| 6,264,578 | B1 | 7/2001 | Ayukawa |
| 6,361,459 | B1 | 3/2002 | Serkh et al. |
| 6,375,588 | B1 | 4/2002 | Frankowski et al. |
| 6,394,247 | B1 | 5/2002 | Monahan et al. |
| 6,394,248 | B1 | 5/2002 | Monahan et al. |
| 6,422,962 | B1 | 7/2002 | Lehtovaara et al. |
| 6,478,118 | B2 | 11/2002 | Astrom et al. |
| 6,554,318 | B2 | 4/2003 | Kohut et al. |
| 6,571,924 | B2 | 6/2003 | Murata et al. |
| 6,582,332 | B2 | 6/2003 | Serkh |
| 6,588,560 | B1 | 7/2003 | Fujiwara |
| 6,592,482 | B2 | 7/2003 | Serkh |
| 6,609,988 | B1 | 8/2003 | Liu et al. |
| 6,637,570 | B2 | 10/2003 | Miller et al. |
| 6,652,401 | B2 | 11/2003 | Liu |
| 6,834,631 | B1 | 12/2004 | Blackburn et al. |
| 6,863,631 | B2 | 3/2005 | Meckstroth et al. |
| 6,893,368 | B2 | 5/2005 | Fujiwara et al. |
| 7,104,909 | B2 | 9/2006 | Asbeck et al. |
| 7,186,196 | B2 | 3/2007 | Quintus |
| 7,347,309 | B2 | 3/2008 | Wiesneth et al. |
| 7,367,908 | B2 | 5/2008 | Lemberger et al. |
| 7,448,972 | B2 | 11/2008 | Garabello et al. |
| 7,644,814 | B2 | 1/2010 | Beattie |
| 7,867,119 | B2 | 1/2011 | Brunetiere |
| 2002/0119850 | A1 | 8/2002 | Dutil |
| 2003/0008739 | A1 | 1/2003 | Asbeck et al. |
| 2003/0098215 | A1 | 5/2003 | Miller et al. |
| 2004/0112700 | A1 | 6/2004 | Liston et al. |
| 2004/0171448 | A1 | 9/2004 | Lemberger et al. |
| 2007/0010361 | A1 | 1/2007 | Kobelev et al. |
| 2007/0021253 | A1 | 1/2007 | Kobelev et al. |
| 2007/0066426 | A1 | 3/2007 | Kamdem et al. |
| 2008/0112658 | A1 | 5/2008 | Justin |
| 2008/0194366 | A1 | 8/2008 | Mevissen et al. |
| 2008/0293527 | A1 | 11/2008 | D'Amicantonio et al. |
| 2009/0272618 | A1 | 11/2009 | Pendergrass et al. |
| 2009/0275432 | A1 | 11/2009 | Dell |
| 2010/0113201 | A1 | 5/2010 | Lannutti |
| 2010/0147646 | A1 | 6/2010 | Lannutti et al. |

FOREIGN PATENT DOCUMENTS

| | | |
|---|---|---|
| EP | 1277989 | 2/2003 |
| EP | 1596098 | 11/2005 |
| EP | 1754914 | 2/2007 |
| EP | 2154394 | 2/2010 |
| FR | 1100460 | 9/1955 |
| FR | 1181842 | 6/1959 |
| JP | 02089838 | 3/1990 |
| JP | 02102956 | 4/1990 |
| JP | 05272606 | 10/1993 |
| JP | 7-190085 | 7/1995 |
| JP | 2000-227128 | 8/2000 |
| JP | 115251/78 | 2/2010 |
| JP | 45040/80 | 7/2010 |
| WO | 2004/109247 | 12/2004 |

OTHER PUBLICATIONS

PCT, International Preliminary Report on Patentability, International Application No. PCT/US2009/041573 (Oct. 17, 2010).

US, Office Action, U.S. Appl. No. 12/112,393 (Sep. 1, 2010).

US, Notice of Allowance, U.S. Appl. No. 12/112,393 (Dec. 17, 2010).

English translation of Office Action (Notice of Reason(s) for Rejection), Japanese Application No. 2011-507546 (Feb. 26, 2013).

PCT, International Search Report and Written Opinion, International Application No. PCT/US2012/029320 (Jun. 8, 2012).

US, Office Action, U.S. Appl. No. 12/786,825 ( Jul. 18, 2012).

CA, Office Action, Canadian Application No. 2,723,044, dated Aug. 1, 2011.

PCT, International Search Report and Written Opinion, International Application No. PCT/US2011/036009, dated Aug. 15, 2011.

US, Office Action, U.S. Appl. No. 12/713,580 (Nov. 5, 2012).

US, Office Action, U.S. Appl. No. 12/786,825 ( Nov. 2, 2012).

US, Advisory Action, U.S. Appl. No. 12/786,825 (Jan. 11, 2013).

KR, Notice of Preliminary Rejection, Korean Application No. 7024789/2010 (Oct. 17, 2012).

PCT, International Search Report and Written Opinion, International Application No. PCT/US2011/023541 (Apr. 1, 2011).

European Search Report and Search Opinion, European Application No. 09739478.7 (Jul. 10, 2013).

AU, Patent Examination Report No. 1, Australian Patent Application No. 2011218879 (Jul. 22, 2013).

CA, Examination Report, Canadian Patent Application No. 2,788,516 (Mar. 3, 2014).

CN, Office Action, Chinese Patent Application No. 200980115435.8 (Sep. 29, 2012).

EP, Search Report, European Patent Application No. 11747845.3 (Mar. 18, 2014).

EP, Search Report, European Patent Application No. 11787102.0 (Feb. 26, 2014).

PULLEY WITH ASYMMETRIC TORQUE-SENSITIVE CLUTCHING

CROSS-REFERENCE TO RELATED APPLICATIONS

This application is a continuation-in-part of application Ser. No. 12/713,580, filed Feb. 26, 2010, which is a continuation-in-part of application Ser. No. 12/112,393, filed on Apr. 30, 2008.

TECHNICAL FIELD

The present application relates generally to pulleys and more particularly to a pulley assembly that utilizes torque-sensitive clutching in response to relative torque-reversals.

BACKGROUND

It is known to drive various automobile accessory assemblies, including for example a water pump, an alternator/generator, a fan for cooling coolant, a power steering pump, and a compressor, using the vehicle engine. In particular, a driving pulley actuated by an engine shaft of the motor vehicle drives an endless drive belt that in turn drives the accessory assemblies through driven pulleys.

Periodic torque pulses initiated by, for example, combustion engine firing can create significant speed transitions which can interrupt smooth operation of the driven components. In addition, inertial and driven speed transitions associated with startup, shutdown, jake braking, gear shifting, etc. can also interrupt operation of the driven components. These transitions can result in undesirable effects such as belt jump, belt wear, bearing wear, noise, etc.

SUMMARY

Improved driven pulley assemblies are disclosed that utilizes torque-sensitive clutching to permit one-way relative motion between an input shaft of a driven accessory and an outer driven sheave of the pulley assembly. When the sheave of the pulley assembly is being driven in the predominant direction of rotation, the clutching mechanism of the pulley assembly engages and drives the accessory input shaft for the desired smooth rotation. When relative torque reversals occur as a result of, for example, driven speed transitions, the internal clutching mechanism of the proposed pulley assembly disengages the driven accessory shaft from the outer driven sheave, thereby permitting the driven shaft to continue to rotate with momentum in the predominant direction of rotation.

Such a pulley assembly, according to one aspect, includes a shaft engaging hub, a nut threaded onto the shaft engaging hub, an annular bushing, and one or more brake shoes positioned around the outside of the annular bushing all housed with a pulley member. The shaft engaging hub has an axis of rotation, an outer threaded surface, and a bore for receiving an accessory input shaft. The pulley member has an outer peripheral belt-engaging surface and a bore with an inner coupling surface. The nut includes an inner threaded surface that is engaged with the outer threaded surface of the shaft engaging hub and has a generally frustoconical outer surface opposite the inner threaded surface. The annular bushing has the nut seated therein for rotation therewith. The brake shoes have an outer coupling surface in frictional contact with the inner coupling surface of the pulley member. The nut is capable of axial translation relative to the annular bushing and the annular bushing is capable of expanding radially outward in response to the axial translation of the nut in a first direction to provide frictional engagement between the inner coupling surface of the pulley member and the outer coupling surface of the brake shoes, which transfers torque from the pulley member to the input shaft.

Thus, when torque is applied to the nut in a first direction, the nut "tightens" onto the shaft engaging hub via the threaded connection and expands the annular bushing to increase the frictional contact between the brake shoes and the pulley member such that the nut and the shaft engaging hub rotate with the pulley member. Then, when torque is applied to the nut in a second direction opposite the first direction, the nut "loosens" on the shaft, i.e., the nut moves axially in the B direction shown in FIG. 9, which allows the annular bushing to contract inward from its expanded state thereby decoupling the brake shoes and hence the nut and shaft from the pulley member such that the shaft engaging hub rotates independently of the pulley member.

The pulley assemblies herein provide several advantages over similar devices designed to permit the overrunning of pulleys. First, by use of a steeply angled engagement between the nut and the annular bushing, the improved design achieves a large amount of clamping force and torque resistance through predominantly radial force with far less axial force. The reduced axial load results in easier deactivation of the threaded connection, even after high torque engagements, for improved responsiveness. Improved responsiveness means a lower break-away torque for deactivation in an over-running condition. Second, according to another aspect, the brake shoes may utilize non-parallel surfaces for engaging with the annular bushing and the pulley member respectively. The parallel relationship of the outer coupling surface of the brake shoe with the inner coupling surface of the pulley member maximizes friction material surface area (thereby reducing wear rate) and reduces forces leading to misalignment. Third, in other embodiments, the addition of a ball bearing for rotational freedom under disengaged over-running not only provides improved structural rigidity, but also extends the life of the assembly by relieving wear on the annular bushing. Fourth, in still other embodiments, the introduction of the grease pockets in the interior of the annular bushing reduces wear on the bushing and the nut and will extend the life of these components. Fifth, the addition of an annular seal reduces the risk of contaminants entering the pulley, which may damage components or introduce a point of additional wear during rotation.

Other advantages and features of the invention will be apparent from the following description of particular embodiments and from the claims.

DETAILED DESCRIPTION

Figure 1:
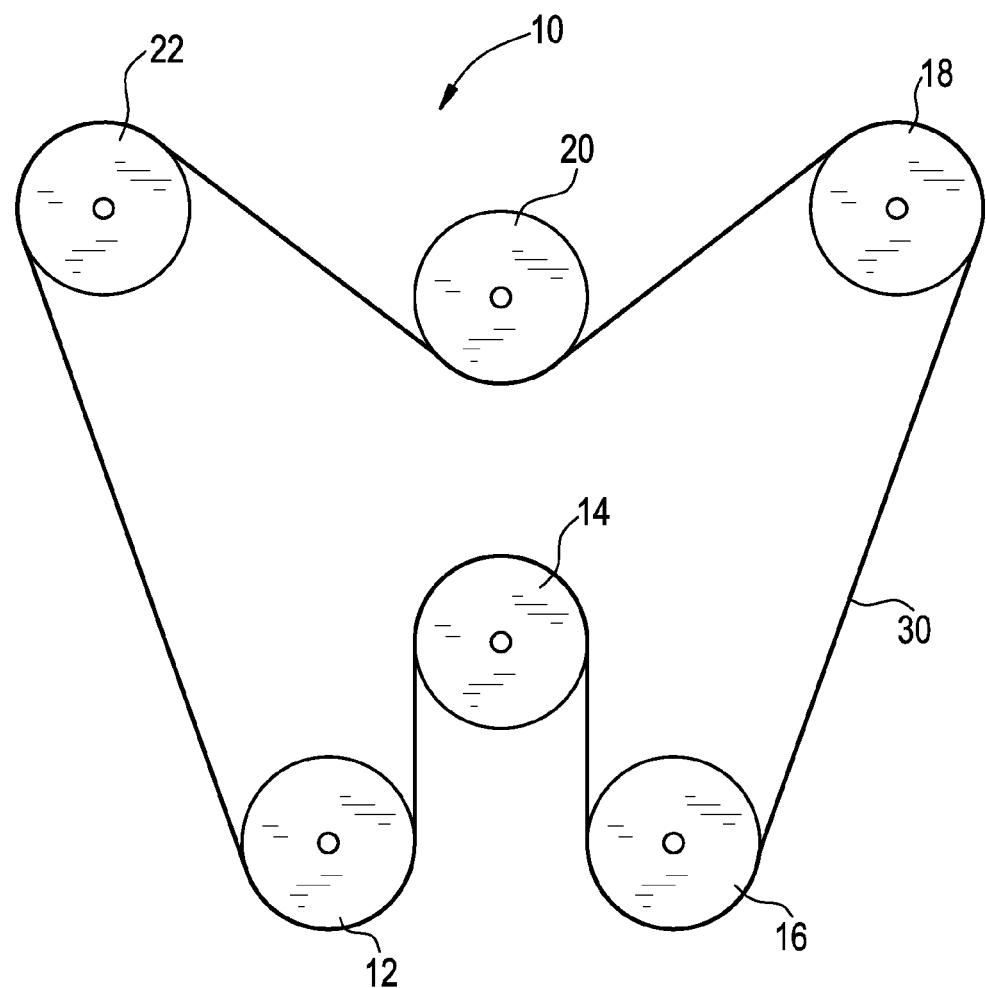
FIG. 1 is a diagrammatic view of an embodiment of an accessory drive system.

The following detailed description will illustrate the general principles of the invention, examples of which are additionally illustrated in the accompanying drawings. In the drawings, like reference numbers indicate identical or functionally similar elements.

Referring to FIG. 1, an accessory drive system 10 of, for example, an internal combustion engine of an automobile includes an endless belt 30 that is used to drive a number of accessories. The various accessories are represented in FIG. 1 diagrammatically by their pulley assemblies. The belt 30 is entrained around a crank pulley assembly 12, a fan/water pump pulley assembly 14, a power steering pulley assembly 18, an idler pulley assembly 20 and a tensioner pulley assembly 22. In some embodiments, the tensioner pulley assembly 22 includes damping, such as asymmetric damping with a frictional damper to resist lifting of the tensioner arm away from the belt 30.

The various accessories are driven through use of pulley assemblies 14, 16, 18, 20 and 22 that are themselves rotated by the belt 30. For purposes of description, pulley assembly 16 of an alternator will be focused on below. It should be noted, however, that the other pulley assemblies of one or more of the other accessories may also operate in a fashion similar to that of pulley assembly 16.

Figure 2:
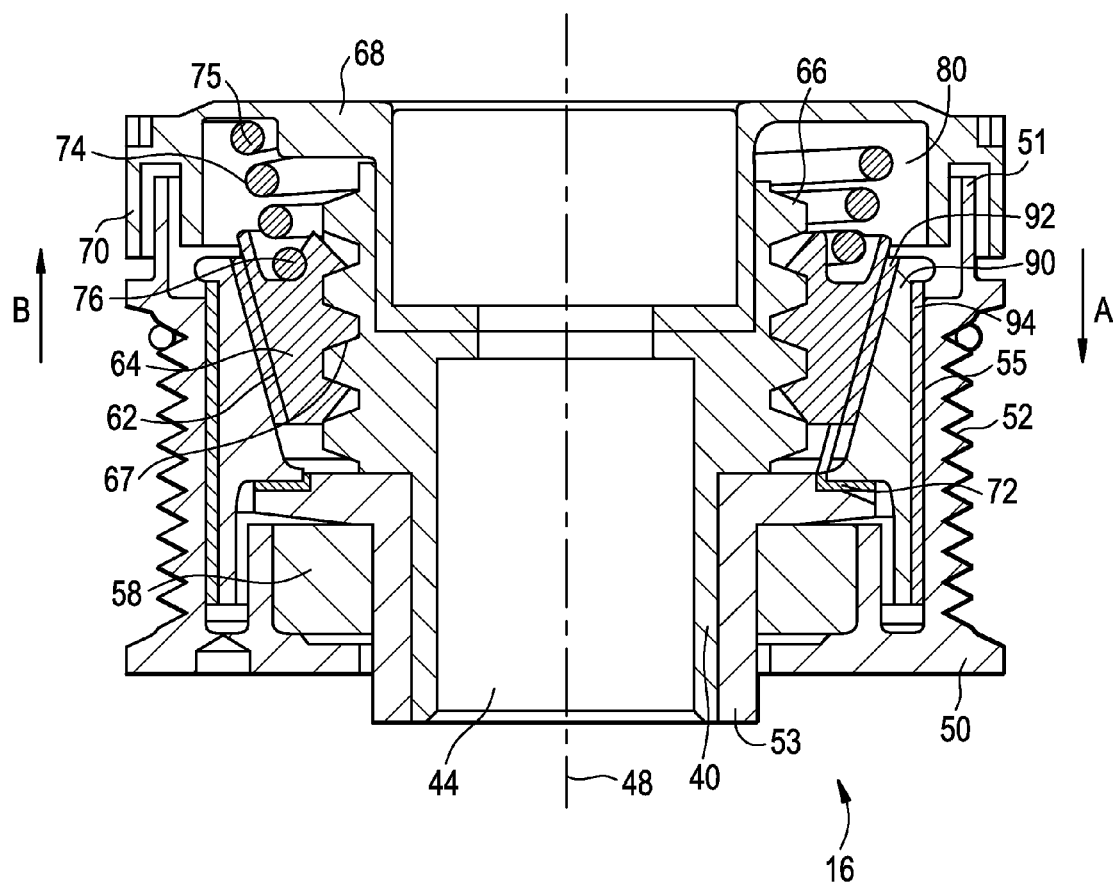
FIG. 2 is a side, section view of an embodiment of a pulley assembly for use in the accessory drive system of FIG. 1.
Figure 3:
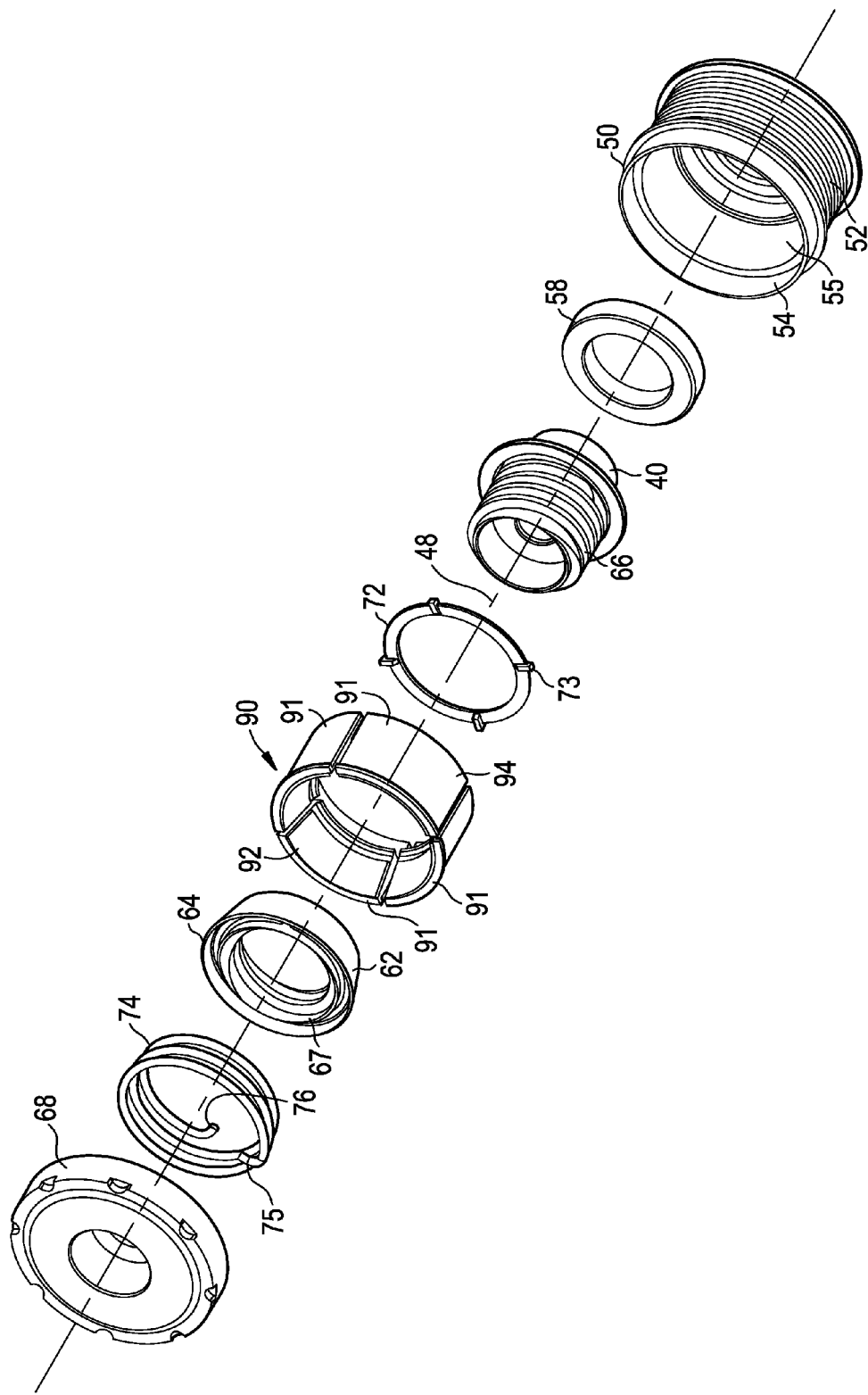
FIG. 3 is an exploded, perspective view of the pulley assembly of FIG. 2.
Figure 4:
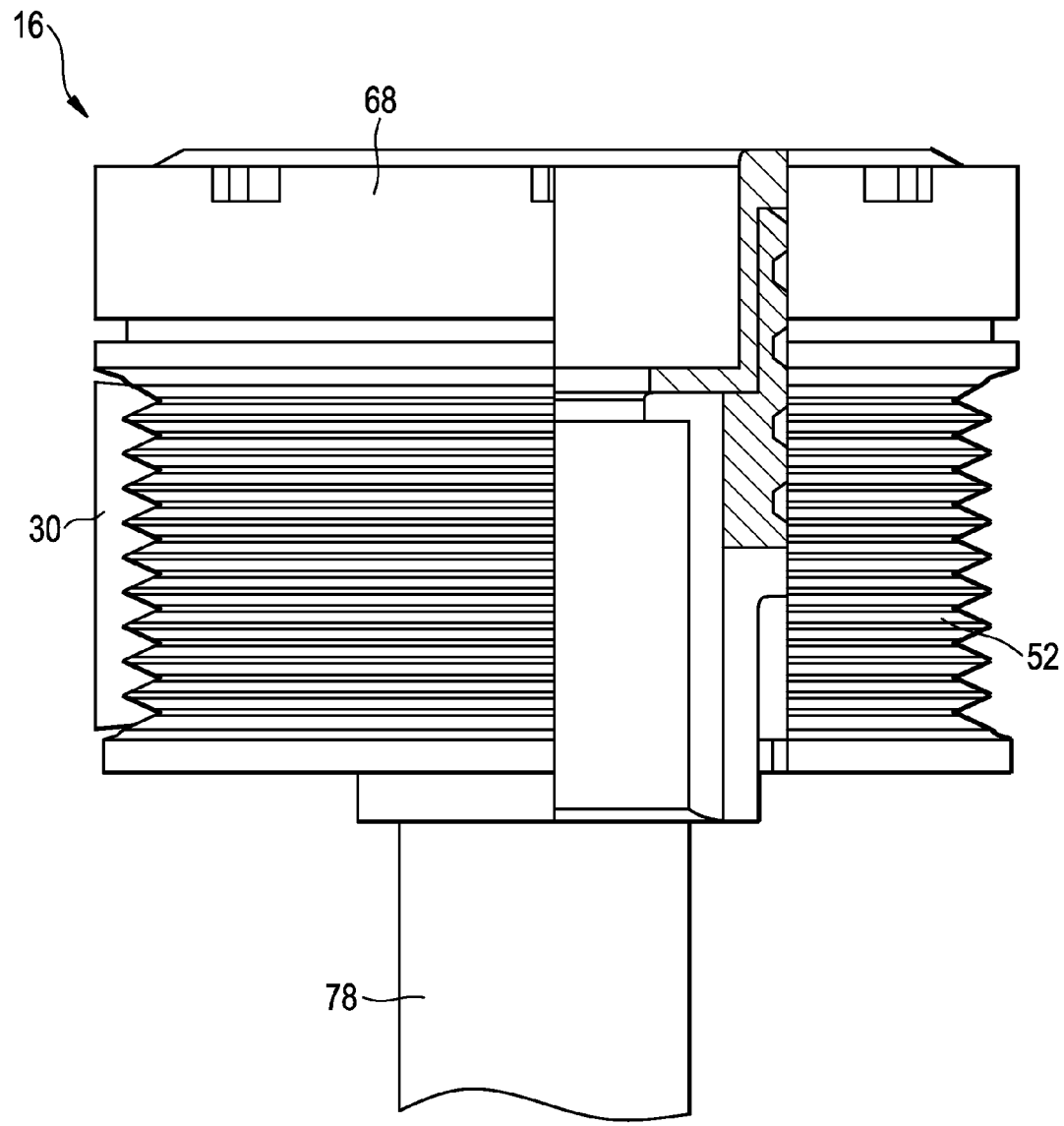
FIG. 4 is a side, partial section view of the pulley assembly of FIG. 2 connected to an input shaft of an alternator.

Referring now to FIGS. 2, 3, and 4, pulley assembly 16 transfers input torque to the input shaft of the alternator when rotated in a predominant rotational direction and also isolates the input shaft from relative torque reversals between the pulley assembly and the input shaft 78 of the alternator (FIG. 4). When such relative torque reversals between the pulley assembly 16 and the input shaft of the alternator occur, an internal clutching system of the pulley assembly 16 acts to disengage the alternator from the torque reversal, thereby permitting the alternator input shaft to continue rotating with momentum in the predominate operational direction. FIG. 4 illustrates the pulley assembly 16 connected to the input shaft 78 of the alternator and engaged with the belt 30.

The pulley assembly 16 includes a shaft engaging hub 40 with an axis of rotation 48, an outer threaded surface 66, and a bore 44 for receiving the input shaft of the alternator. The shaft engaging hub 40 may be mated to the input shaft of the alternator by a Woodruff key, as is well known, to prevent the shaft engaging hub 40 from freely rotating about the input shaft. Of course other connections between the shaft engaging hub 40 and the input shaft of the alternator are also possible including, for example, a spline. In some embodiments, an annular collar or sleeve 53 may be fitted over or coupled to the shaft engaging hub 40 at a location so as not to interfere with the outer threaded surface 66.

A pulley member 50 is located about the shaft engaging hub 40 and includes a central bore or opening 54 that is sized such that the pulley member can rotate about the hub. The pulley member 50 also includes an outer, peripheral belt-engaging surface 52 that engages belt 30, and an inner coupling surface 55. The inner coupling surface 55 may be made of or coated with a friction material so as to engage and transfer torque from pulley member 50 to other components. In the illustrated embodiment, the belt engaging surface 52 is profiled including V-shaped ribs and grooves to mate with corresponding ribs and grooves on the belt 30. Other configurations are possible, such as cogs, flat or rounded ribs and grooves.

In some embodiments, a roller bearing 58 may be located between the hub 40 and the pulley member 50 to permit stable rotation of the pulley member 50 relative to the hub 40 when disengaged. The inner race of the roller bearing 58 may be adjacent and coupled to the shaft engaging hub 40. The outer race of the roller bearing 58 may be adjacent and coupled to the pulley member 50. In an embodiment including a sleeve 53 over the hub 40, as in FIG. 2, the inner race of the roller bearing 58 may be adjacent and coupled to the sleeve 53 rather than the hub 40 directly. The use of a roller bearing may improve the overall structural rigidity of the assembly and extend the life of the assembly by reducing wear as elements of the clutching mechanism rotate relative to one another.

A nut 64 having an inner threaded surface 67 is threadably engaged with the outer threaded surface 66 of the shaft engaging hub 40 such that relative rotation of the nut 64 about the hub 40 in a first rotational direction causes the nut 64 to translate axially in a first linear direction A along the axis of rotation, while relative rotation of the nut 64 in the opposite direction causes it to translate axially in an opposite linear direction B. The nut 64 also includes an outer coupling surface 62 that is angled relative to the axis of rotation 48 of the shaft engaging hub 40. According to one embodiment, the acute angle formed between the nut's outer coupling surface 62 and the axis of rotation 48 of the hub 40 is between 5 and 45 degrees. In another embodiment, the angle between the outer coupling surface 62 and the axis of rotation 48 is preferably between about 10 to 20 degrees. The optimal angle depends, at least in part, on the coefficient of friction between materials engaged at the coupling surface, the helix or pitch angle of the nut's threaded surface 67, the coefficient of friction of the threads, and the engage/disengage torque requirement of the design.

Figure 5:
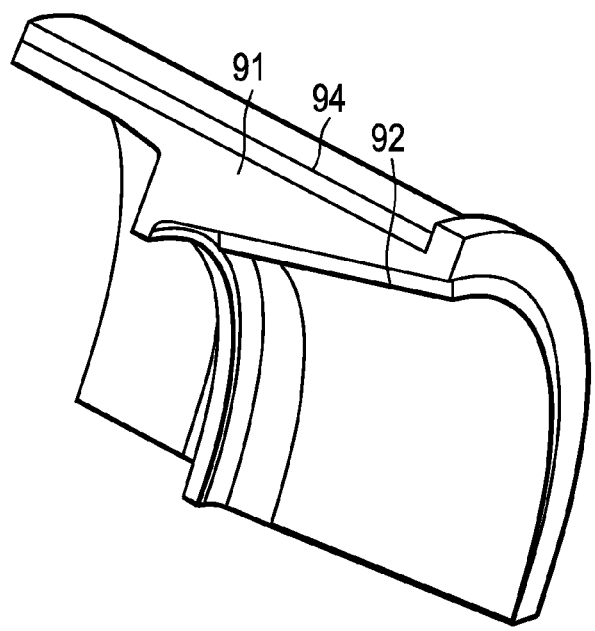
FIG. 5 is a perspective view of a brake shoe according to one embodiment.
Figure 6:
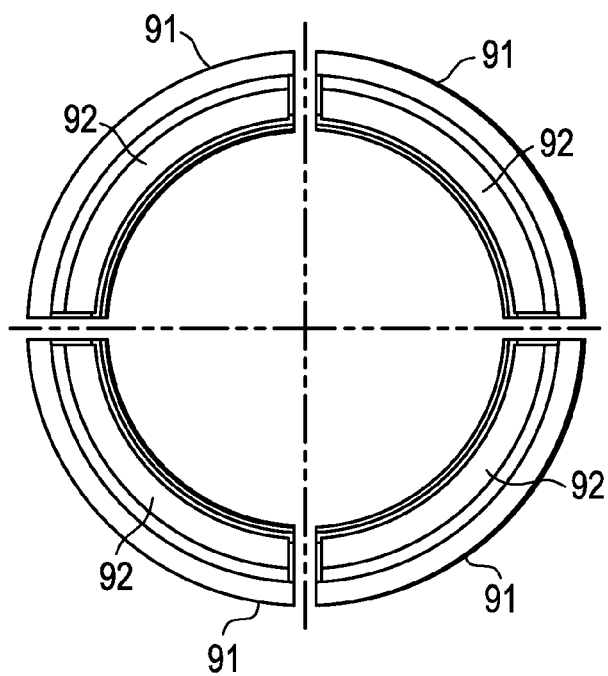
FIG. 6 is a top view of four arcuate brake shoes aligned to cooperatively form an annular brake member according to one embodiment.

Interposed between the pulley member 50 and the nut 64 is a brake member 90. As shown in FIGS. 5 and 6, the brake member 90 may be made of a plurality of arcuate brake shoes 91 that are arranged cooperatively around the outer circumference of the nut 64. According to another embodiment, the brake member 90 may be a continuous ring with one or more flexible fingers that allow the ring to expand or contract in response to the movement of the nut 64. The brake member 90 includes a first coupling surface 92 that faces the outer coupling surface 62 of the nut and a second coupling surface 94 that faces the inner coupling surface 55 of the pulley member 50. Cooperative frictional engagement between these facing pairs of coupling surfaces provides a clutching action between the pulley member 50 and the shaft engaging hub 40. In some embodiments, the brake member 90 may be a composite and the first and second coupling surfaces, 92, 94 may be made from or coated with a friction material. An annular pivot bushing 72 may also be positioned between the brake member 90 and the hub 40 or collar 53, if present. As shown in FIG. 3, the bushing 72 may include one or more spacers 73 to keep the brake shoes 91 of the brake member 90 properly positioned. The pivot bushing 72 may be made from a material having a very low coefficient of friction.

In the embodiment of FIG. 2, the first and second coupling surfaces 92, 94 of the brake member 90 are non-parallel. In particular, the second coupling surface 94 may be substantially parallel to the axis of rotation 48 of the shaft engaging hub 40, while the first coupling surface 92 may form substantially the same angle with the axis of rotation 48 as the angle formed between the outer coupling surface 62 of the nut and the axis of rotation 48 of the shaft engaging hub 40. By independently selecting a first angle of engagement between the first coupling surface 92 and the nut 64, on the one hand, and a second angle of engagement between the second coupling surface 94 and the pulley member 50 on the other hand, the brake member 90 is configured to maximize friction material surface area (thereby reducing wear rate), maximize the available clamping force, minimize the force required to break away in an over-run condition, and reduce forces leading to misalignment. In addition, the angles of engagement and frictional properties of the engaging surfaces can be selected to establish a maximum sustainable engagement torque (or "break-away torque") in the event the drive dynamics are excessive, even in the predominant rotational direction.

The engaging friction surfaces of the nut 64, brake member 90 and pulley member 50 may be formed from or coated with a friction material including known brake materials. Acceptable materials include, but are not limited to, non-asbestos molded materials with medium to high friction, good stability and good wear characteristics. At least one material that is suitable for the application comprises a flexible molded, two roll extruded, metal-free, phenolic bound friction lining containing cured rubber along with organic and inorganic friction modifiers and fillers. Selection of the friction material depends on the desired coefficient of friction and wear characteristics, which depends on the specific application and operating conditions.

In a first operating condition in which the pulley assembly 16 drives the input shaft 78, the belt 30 drives the pulley member 50 in a first rotational direction about the axis of rotation 48. In this condition, frictional engagement between the inner coupling surface 55 of the pulley member 50 and the second coupling surface 94 of the brake member 90 urges the brake member 90 to rotate in the first rotational direction. Further frictional engagement between first coupling surface 92 of the brake member 90 and the outer coupling surface 62 of the nut 64 in turn urges the nut 64 to rotate in the first direction. Rotation of the nut 64 in the first direction causes the nut 64 to translate axially along the axis of rotation 48 (in the direction of arrow A) via threaded engagement with the hub 40. As the nut 64 translates axially in direction A with direct contact to the brake member 90, the brake member 90 expands radially outwardly such that the contact pressure and friction force between the nut 64, the brake member 90, and the pulley member 50 increases to frictionally couple the nut 64 to the brake member 90 for rotation with the brake member 90 and the pulley member 50.

In a second operating condition, also referred to as an overrunning condition, the input shaft 78 disengages from the pulley member 50 and continues to rotate with momentum in the first rotational direction when the pulley member 50 experiences a relative torque reversal or sudden slowdown. In this condition, the pulley member 50 may continue to rotate in the first direction but with less angular velocity than the velocity at which it had been driving the input shaft 78. The sudden decrease of angular velocity at the pulley member 50 has the effect of a relative reversal of torque, which is translated from the pulley member 50 to the nut 64 through the brake member 90 via the previously described frictional engagements. The application of torque to the nut 64 in the second direction causes the nut to rotate in the second direction relative to the shaft engaging hub 40, even though in a absolute sense both the nut 64 and the hub 40 may continue to rotate in the first direction about the axis of rotation 48. Rotation of the nut 64 in the second direction relative to the hub 40 causes the nut 64 to loosen or translate axially away from the brake member 90 (in the direction of arrow B) via the threaded connection to the hub 40. As the contact pressure and friction force between the nut 64, the brake member 90, and the pulley member 50 decrease, they will eventually uncouple and rotate relative to one another with minimal friction such that the input shaft 78 rotates independently of the pulley member 50.

A cover plate 68 may be fastened to the pulley assembly 16 by any conventional means to contain the working components in a compact unit and protect them from damage and debris. In particular, the cover plate 68 may be fastened to the hub 40 or the input shaft 78 so as to rotate with those components. According to one embodiment, the cover plate 68 includes an outer, axially extending flange 70 that extends over and covers a flange 51 on the pulley member 50 to form a tortuous (i.e., indirect) path between the interior and exterior of the pulley assembly 16. Using such a configuration allows the pulley member 50 to rotate relative to the cover plate 68 and hub 40 while at the same time providing protection against contaminants and debris for the inner components of the pulley assembly 16.

According to another aspect, a torsion spring 74 may be located within a cavity 80 between the cover plate 68 and the nut 64 with a first end of the spring 75 engaged with the cover plate 68 and a second end of the spring 76 engaged with the nut 64. The torsion spring 74 may be preloaded to bias the nut 64 to rotate in the first direction about the threaded connection with the hub 40. Alternatively, the spring may simply load or wind up in response to axial movement of the nut 64 away from the brake member 90. The use of the torsion spring 74 improves the responsiveness of the clutching assembly and prevents the nut 64 from remaining disengaged from the brake member 90 after a relative torque reversal. Specifically, in the overrunning condition, the torque applied by the brake member 90 to the nut 64 in the second direction may be sufficient to overcome the torsion applied by the torsion spring 74 thus allowing the nut 64 to translate and decouple from the brake member 90. When the relative torque reversal event is over, the torsion spring 74 urges the nut 64 back into engagement with the brake member 90 so that the pulley member 50 can once again drive the hub 40 and input shaft 78. In other embodiments, an axial spring, rather than a torsion spring, may be used to bias the nut 64 down the threaded hub 40 into engagement with the brake member 90.

Figure 7:
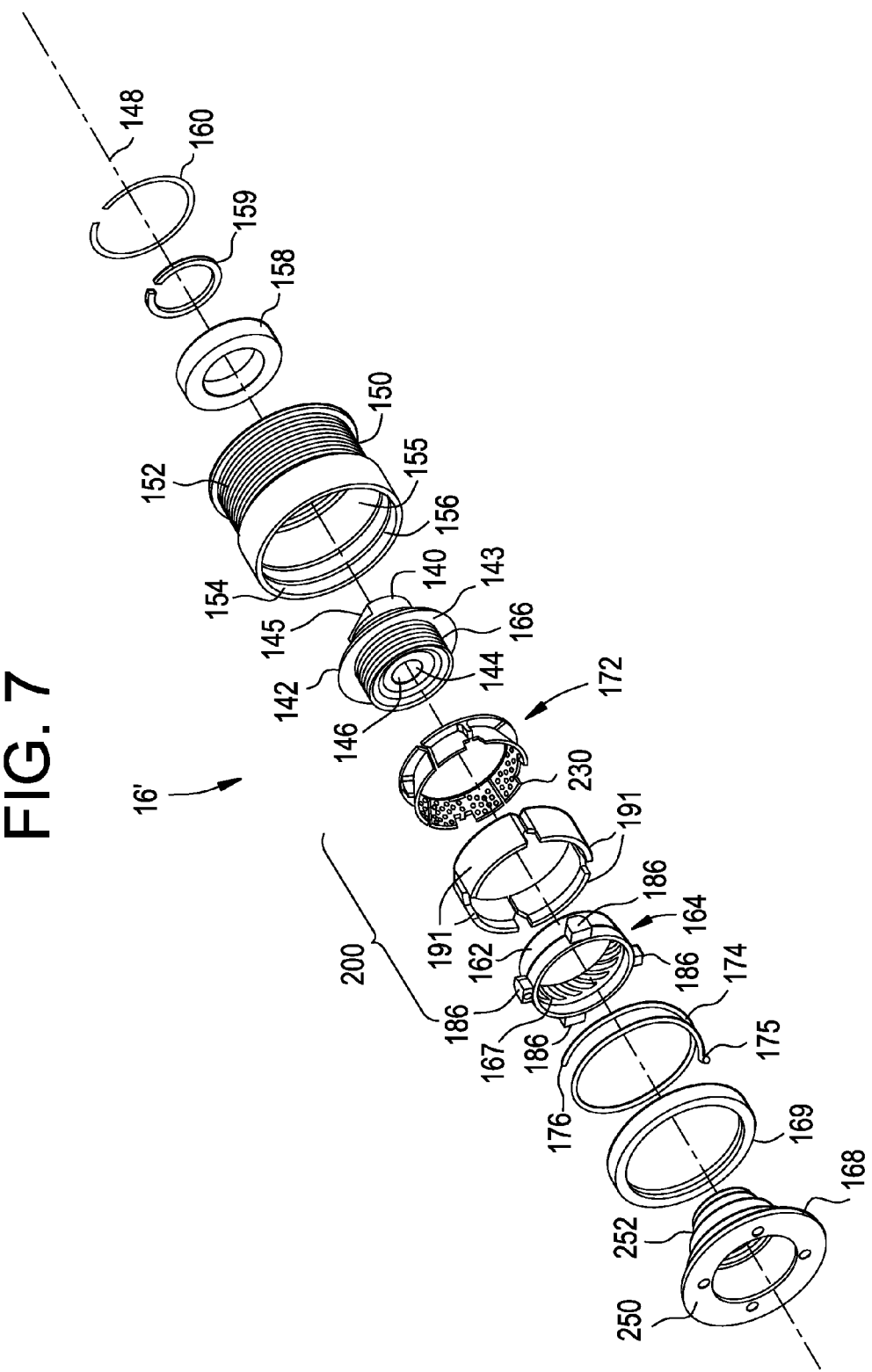
FIG. 7 is an exploded, perspective view of one embodiment of a pulley assembly.
Figure 8:
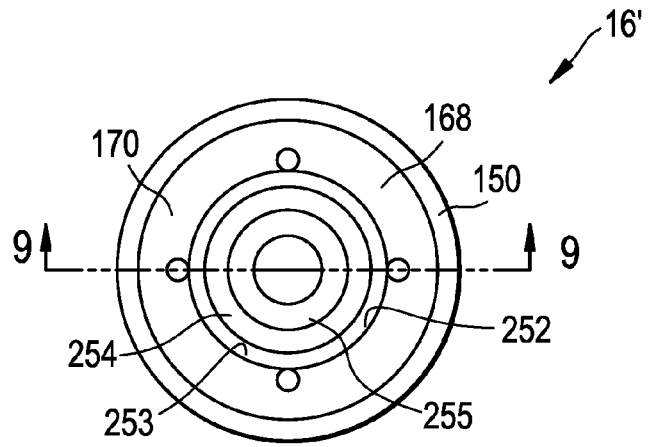
FIG. 8 is an assembled, top view of the pulley assembly of FIG. 7.
Figure 9:
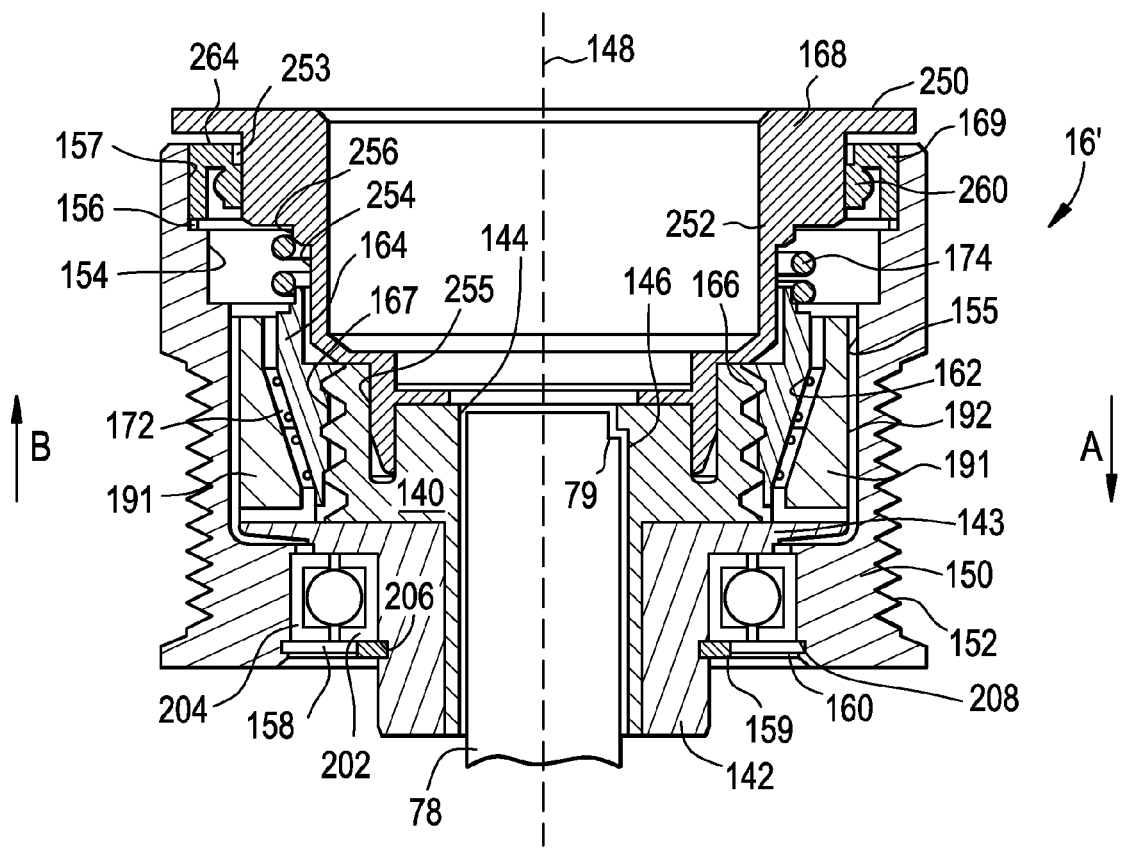
FIG. 9 is a side, section view of the assembled pulley of FIG. 8 taken along line 9-9.

Referring now to FIGS. 7, 8, and 9, a second embodiment of a pulley assembly, generally designated 16', is shown. The pulley assembly 16' transfers input torque to the input shaft 78 of an alternator when rotated in a predominant rotational direction and also isolates the input shaft 78 from relative torque reversals between the pulley assembly 16' and the input shaft 78 of the alternator. The input shaft 78 is shown in FIG. 9. When such relative torque reversals between the pulley assembly 16' and the input shaft 78 occur, an internal clutching system of the pulley assembly 16' acts to disengage the alternator from the torque reversal, thereby permitting the input shaft 78 to continue rotating with momentum in the predominate operational direction. Pulley assembly 16' may be connected to the input shaft 78 and engaged with a belt similarly to pulley assembly 16 as shown in FIG. 4.

As shown in FIGS. 7 and 9, the pulley assembly 16' includes a shaft engaging hub 140 with an axis of rotation 148, an outer threaded surface 166, and a bore 144. The bore 144 receives the input shaft 78 of the alternator. The shaft engaging hub 140 may be keyed to the input shaft 78 of the alternator to prevent the shaft engaging hub 140 from freely rotating about the input shaft. In one embodiment, this may be by a Woodruff key. In another embodiment, the shaft engaging hub 140 may include a keyway 146 within bore 144 that is shaped to mate with a feature 79 on the outer diameter of the input shaft 78. Of course other connections between the shaft engaging hub 140 and the input shaft 78 of the alternator are also possible including, for example, a splined connection.

A pulley member 150 is located about the shaft engaging hub 140 and includes a central bore or opening 154 that is sized such that the pulley member can rotate about the hub. The pulley member 150 also includes an outer, peripheral belt-engaging surface 152 that engages a belt such as belt 30 in FIG. 1, and an inner coupling surface 155. The inner coupling surface 155 may be made of or coated with a friction material so as to engage and transfer torque from pulley member 150 to other components. In the illustrated embodiment, the belt engaging surface 152 is profiled, such as with V-shaped ribs and grooves to mate with corresponding ribs and grooves of a belt. Other configurations are possible, such as cogs, flat or rounded ribs and grooves.

In some embodiments, an annular collar or sleeve 142 may be fitted over or coupled to the shaft engaging hub 140 at a location so as not to interfere with the outer threaded surface 166. In one embodiment, the sleeve 142 may be integral with the shaft engaging hub 140. The sleeve 142 includes a plate-like flange 143 that acts as a seat to seat the shaft engaging hub 140 in the bore 154 of the pulley member 150.

Still referring to FIGS. 7 and 9, a bearing 158 such as a roller bearing may be received in the bore 154 of the pulley 150 in a position that locates the bearing between the hub 140 and the pulley member 150 to permit stable rotation of the pulley member 150 relative to the hub 140 when the internal clutching system is disengaged. The inner race 202, shown in FIG. 9, of the bearing 158 may be adjacent and coupled to the shaft engaging hub 140 and/or the sleeve 142 thereof. The outer race 204 of the bearing 158 may be adjacent and coupled to the pulley member 150. In an embodiment without a sleeve 142 over the hub 140, the inner race 202 of the bearing 158 may be adjacent and directly coupled to the hub 140 rather than the sleeve 142. The use of a roller bearing may improve the overall structural rigidity of the assembly and extend the life of the assembly by reducing wear as elements of the clutching mechanism rotate relative to one another.

The bearing 158 may be retained in the pulley member 150 by a flange of the pulley as shown in FIG. 2. In another embodiment, as shown in FIGS. 7 and 9, the bearing may be retained in the pulley member 150 using an inner snap ring 159 and an outer snap ring 160. The inner snap ring 159 has a snap fit within an annular recess 206 defined within the sleeve 142 or the hub 140. The outer snap ring 160 has a snap fit within an annular recess 208 defined within the pulley member 150. The snap rings 159, 160 prevent the bearing from being urged out of the pulley member 150 by vibrations and/or any internal axial force generated from the engagement of the brake shoes 191 with the pulley member 150.

Figure 10:
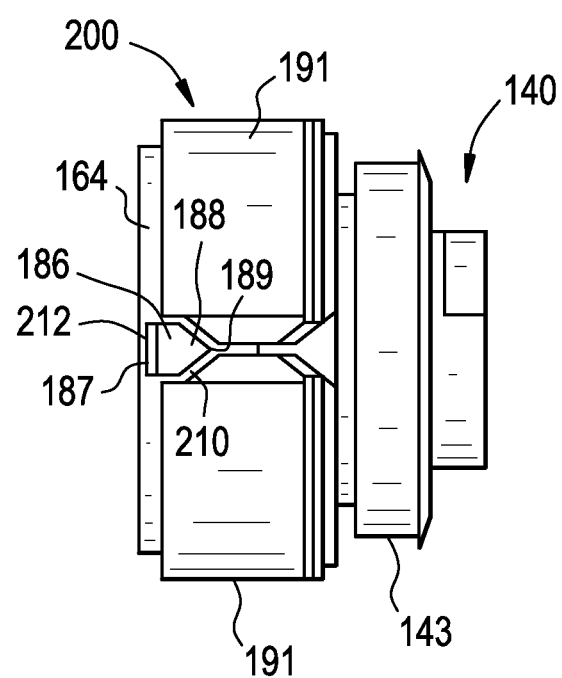
FIG. 10 is a side, perspective view of a subassembly within the pulley assembly of FIG. 8.

As shown in FIGS. 7, 9, and 10, the pulley assembly 16' includes a nut 164 having an inner threaded surface 167 threadably engaged with the outer threaded surface 166 of the shaft engaging hub 140 when assembled. This configuration is such that relative rotation of the nut 164 about the hub 140 in a first rotational direction causes the nut 164 to translate axially in a first linear direction A along the axis of rotation 148, while relative rotation of the nut 164 in the opposite direction causes it to translate axially in an opposite linear direction B, as labeled on FIG. 9. The translation of the nut 164 in direction A ultimately results in increased frictional engagement between the brake shoes 191 and the pulley member 150, and, conversely, translation of the nut 164 in direction B results in decreased frictional engagement therebetween and, if enough translation occurs in direction B, the pulley member 150 is ultimately decoupled from the brake shoes 191, as will be explained in more detail below.

Figure 11:
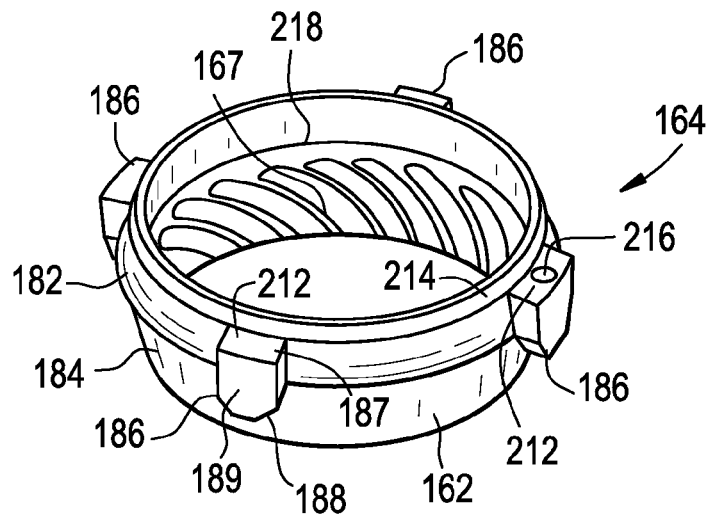
FIG. 11 is a side perspective view of a nut.

Now referring to FIG. 11, the nut 164 has an upper portion 182 and a lower portion 184. The upper portion 182 is a generally hollow, cylindrical member having one or more tabs 186 protruding radially outward from the outer surface thereof. The tabs 186 have an upper end 187 and a lower end 188. The upper end 187 has a generally flat planar upper surface 212 and the lower end 188 is generally chamfered to a point 189. The chamfer defining the point 189 is such that the tab 186 can nest within a divot 210 defined between juxtaposed brake shoes 191 as shown in FIG. 10. The upper portion 182 also includes a lip 214 that functions as a spring seat. The lip 214 includes a spring retention feature 216, such as a hole, slot, hook, recess, abutment, or the like to retain an end of the spring. A hole is illustrated in FIG. 11 as the spring retention feature 216. The spring retention feature 216 may be positioned such that it is in or near the upper surface 212 of a tab 186.

As shown in FIG. 11, the transition from the upper portion 182 to the lower portion 184 may be defined by a step-wise change in the inner diameter of the nut. The inner diameter of the upper portion 182 may be larger than the inner diameter of the lower portion 184, which forms step 218 therebetween. The inner diameter of the lower portion 184 may be smaller than the upper portion 182 and includes the threaded surface 167 as the inner surface of the lower portion 184. The lower portion 184 also includes an outer surface 162 that is angled relative to the axis of rotation 148 of the shaft engaging hub 140. The angled outer surface 162 results in the nut 164 having a generally frustoconical lower portion when viewed from the exterior. The acute angle formed between the nut's outer surface 162 and the axis of rotation 148 of the hub 140 may be between 5° and 45°. In another embodiment, the angle between the outer surface 162 and the axis of rotation 148 may be between about 10° to 20°. The optimal angle depends, at least in part, on the coefficient of friction between materials engaged with the outer surface of the nut 164, the helix or pitch angle of the nut's threaded surface 167, the coefficient of friction of the threads, and the engage/disengage torque requirement of the design.

Figure 12:
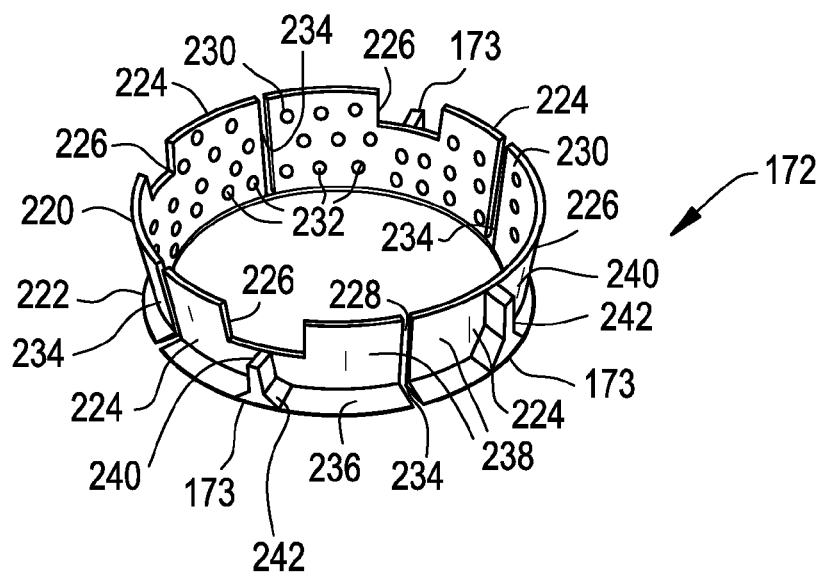
FIG. 12 is a side perspective view of an annular bushing.

The nut 164 in the assembled view of FIG. 9 is seated within an annular bushing 172 with the generally frustoconical outer surface 162 adjacent to and mating against a frustoconical inner surface 230 of the annular bushing 172. Referring now to FIG. 12, the annular bushing 172 has a first end 220 that is defined by a plurality of panels 224 with each panel separate from the two adjacent panels, which defines slits 234 therebetween and a second end 222 defined by a flange 236 that extends radially outward from the panels 224 such that the flange 236 is generally perpendicular to the axis of rotation 148. One of the slits 234 is an opening 228 that extends from the first end 220 to the second end 222 and that cuts through the flange 236. The opening 228 will allow the annular bushing 172 to expand radially outward when the nut 164 moves in the A direction and to contract radially inward when the nut 164 moves in the B direction.

Still referring to FIG. 12, each of the panels 224 of the annular bushing includes a keyway 226 cut into the top edge thereof opposite where the panel connects to the flange 236.

The keyways 226 are shaped and positioned in each panel 224 to receive the tabs 186 of the nut 164 when the nut 164 is seated in the annular bushing 172. The tabs 186 and notches 226 key the nut 164 and the annular bushing 172 together for rotation together about the axis of rotation 148. In FIG. 12, the keyways 226 appear as notches recessed into each panel proximal the center of the panel 224. The annular bushing 172, in particular the panels 224, may be glass-filled nylon and may include a plurality of pockets 232 recessed into the inner surface 230 thereof that may retain grease therein. The introduction of the grease pockets in the interior of the annular bushing reduces wear on the bushing and the nut and will extend the life of these components. The annular bushing 172 also reduces the cost of the pulley assembly 16' by removing one of the brake material surfaces required in the embodiment of FIGS. 1-6 and therefore requiring less brake material. This embodiment also benefits from reduced wear on the nut 164 because the nut does not include a surface experiencing frictional engagement with another component.

The outer surface 238 of each of the panels 224 is generally frustoconical, similar to the inner surface 230 thereof. On the outer surface 238 of each panel 224, generally centered with the keyway 226, is a spacer 173. In one embodiment, the spacer 173 has an upper end 240 that is level with the most recessed portion or bottom of the keyway 226 and extends to its lower end 242, which is positioned on the upper surface of the flange 236. The lower end 242 forms a base that is generally wider than the upper end 240 and the left and right sides of the spacer 173 gradually taper from the base to the upper end 240 and include a generally arcuate section proximate the base. The spacers 173 are positioned such that flange 236 extends between the lower end 242 of each spacer 173 and portions of the outer surface 238 of two panels 224 extend therebetween to form a stand for a brake shoe 191.

As shown in FIGS. 7, 9 and 10, the annular bushing has four panels 224 and four spacers 173 which define four separate stands for holding brake shoes 191. While four brake shoes 191 are shown, the invention is not limited thereto. Another embodiment may have two, three, five, or six brake shoes 191. The annular bushing 172 would be modified to have the necessary number of panels 224 and/or spacers 173 to provide enough stands for each brake shoe 191. When the brake shoes 191 are seated in the stands defined by the annular bushing 172, which is placed within the pulley member 150, the brake shoes 191 are between an inner coupling surface 155 of the pulley member 150 and the annular bushing 172. The spacers 173, as shown in FIG. 10, keep the bottom of the brake shoes 191 separated and the brake shoes 191 as a whole properly positioned, with the spacer 173 extending upward between the brake shoes 191 immediately opposite where the tabs 186 of the nut 164 separate the top of the brake shoes 191.

The brake shoes 191, as shown in FIG. 7, are a plurality of arcuate brake shoes that are arranged cooperatively around the outer circumference of the annular bushing 172. The brake shoes 191 each include an outer coupling surface 192 that faces the inner coupling surface 155 of the pulley member 150. Cooperative frictional engagement between the outer coupling surface 192 and the inner coupling surface 155 provides a clutching action between the pulley member 150 and the shaft engaging hub 140. As seen in FIG. 9, each brake shoe 191 has an outer coupling surface 192 for frictional engagement with the pulley member 150 and an inner surface 194 that mates with the stand formed by the annular bushing, i.e., a portion of the outer surface of two adjacent panels 224 between consecutive spacers 173. The outer coupling surface 192 and the inner surface 194 are non-parallel to one another when viewed in a longitudinal cross-section. In particular, the outer coupling surface 192 may be substantially parallel to the axis of rotation 148 of the shaft engaging hub 140, while the inner surface 194 may form substantially the same angle with the axis of rotation 148 as the angle formed by the outer frustoconical surface 238 of the annular bushing 172. By independently selecting a first angle of engagement for mating the lower portion 184 of the nut 164 and the annular bushing 172 with the inner surface 194 of the brake shoes, on the one hand, and a second angle of engagement between the outer coupling surface 192 and the pulley member 150 on the other hand, the engagement of the coupling surfaces 192, 194 is configured to maximize friction material surface area (thereby reducing wear rate), maximize the available clamping force, minimize the force required to break away in an over-run condition, and reduce forces leading to misalignment. In addition, the angles of engagement and frictional properties of the engaging surfaces can be selected to establish a maximum sustainable engagement torque (or "breakaway torque") in the event the drive dynamics are excessive, even in the predominant rotational direction.

In some embodiments, the individual brake shoes 191 may be a composite and the first coupling surface 192 may be made from or coated with a friction material. Frictional material may reduce wear of the brake shoes and provide longevity to the pulley assembly 16'. Similarly, the inner coupling surface 155 of the pulley member 50 may be formed from or coated with a friction material including known brake materials. Acceptable materials include, but are not limited to, non-asbestos molded materials with medium to high friction, good stability and good wear characteristics. At least one material that is suitable for the application comprises a flexible molded, two roll extruded, metal-free, phenolic bound friction lining containing cured rubber along with organic and inorganic friction modifiers and fillers. Selection of the friction material depends on the desired coefficient of friction and wear characteristics, which depends on the specific application and operating conditions.

Referring back to FIGS. 7 and 9 and now FIG. 8, the pulley assembly 16' also includes a cover 168 fastened to the pulley assembly 16' by any conventional means to contain the working components in a compact unit inside the pulley member 150 and protect them from damage and debris. In particular, the cover 168 may be fastened to the hub 140 or the input shaft 78 so as to rotate with those components. According to one embodiment, the cover 168 includes a plate-like, annular ring at its first end 170 that has a tiered, tubular plug 252 extending from the underside of the first end 250. The plug 252 may include a plurality of tiers 253, 254, 255 that decrease in inner and outer diameter with the largest diameters being that of the tier closest to the first end, first tier 253, and the smallest diameter being that of the tier furthest from the first end, identified as the third tier 255. The diameters of the tiers should be such that they provide space for other components or mate with other components of the pulley assembly 16'.

Figure 13:
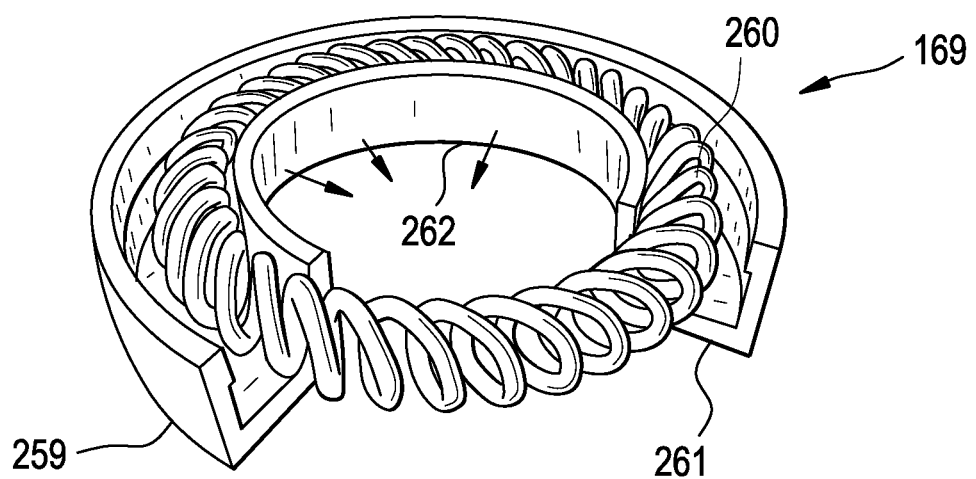
FIG. 13 is a bottom perspective view of an annular seal.

The largest diameter tier, first tier 253, of the cover 168 may form a seal with the inner surface of an annular seal 169 that can provide a radial clamping force onto the first tier 253 of the cover 168. The annular seal 169 has a generally secure fit against the inner annular surface 157 within the bore 154 of the pulley member 150. The bore 154 of the pulley member includes an internal annular shoulder 156 that prevents the annular seal 169 from moving axially inward toward the other components of the pulley assembly 16'. The shoulder 156 is generally perpendicular to the inner annular surface 157 of the bore 154 when viewed in the cross-section of FIG. 9. The secure fit of the annular seal 169 within the pulley member 150 results in the annular seal 169 rotating with the pulley body 150 and therefore rotating relative to the cover 168, which rotates with the hub 140 and shaft 78. In one embodiment, the annular seal 169 may be an oil seal 259, similar to the one illustrated in FIG. 13, that includes a garter spring 260 seated in a ring 261 of elastomeric material that has a generally U shaped cross-section. The garter spring 261 provides a radially inwardly directed clamping force that can direct the inner surface 262 of the oil seal 259 into continued engagement with the first tier 253 of the cover 168 over the life of the pulley assembly 16', even as the elastomeric material wears, to keep the assembled sealed from contaminants.

As shown in FIG. 9, the plate-like, annular ring 170 of the cover 168 may extend over the seal 169 to protect the upper surface 264 of the seal from damage, for example, from a rock or other debris that might damage the seal if the surface 264 was exposed. In many applications the pulley member 150 is positioned proximate a fan used to cool the radiator of an engine system. The fan tends to blow dust, dirt, rocks, and other debris at the pulley member 150 at high velocity. For this reason, protecting the surface 264 of the seal is instrumental in extending the life of the pulley assembly 16'.

The second tier 254 may receive a spring 174 such as a torsion spring which is located between the cover 168 and the nut 164. A first end 175 of the spring 174 is engaged with the cover 168. In one embodiment, the first end 175 may be received by a spring seat 256 of the second tier 254 of the cover 168. The second end 176 of the spring 174 engages the nut 164. In particular, it engages a spring retention feature 216 that may be positioned in one of the tabs 186 of the nut 164. The torsion spring 174 may be preloaded to bias the nut 164 to rotate in a first direction about the threaded connection with the hub 140. Alternatively, the spring may simply load or wind up in response to axial movement of the nut 164 toward the cover end of the pulley assembly 16'.

Still referring to FIG. 9, the use of the torsion spring 174 improves the responsiveness of the clutching assembly and urges the nut 164 into engagement with the annular bushing 172 even after a relative torque reversal. Specifically, in the overrunning condition, the torque applied by the brake shoes 191 to the nut 164 in the second direction may be sufficient to overcome the torsion applied by the torsion spring 174; thus, allowing the nut 164 to translate in the B direction (FIG. 9), which results in the annular bushing 172 retracting radially inward toward the hub 140 and as a result decouples the brake shoes 191 from the pulley member 150. In this condition, the hub 140 rotates independently of the pulley member 150, i.e., the hub is disengaged from pulley member. When the relative torque reversal event is over, the torsion spring 174 urges the nut 164 to rotate about the threading 166 of the hub 140 which translates the nut 164 in the A direction to expand the annular bushing 172 radially outward so that the brake shoes 191 once again engage the pulley member 150. Once engaged, the pulley member 150 can now drive the hub 140 and input shaft 78. In other embodiments, an axial spring, rather than a torsion spring, may be used to bias the nut 164 down the threaded hub 140 into engagement with the annular bushing 172.

In a first operating condition in which the pulley assembly 16' of FIG. 9 drives the input shaft 78, a belt 30 (not shown) drives the pulley member 150 in a first rotational direction about the axis of rotation 148. In this condition, frictional engagement between the inner coupling surface 155 of the pulley member 150 and the outer coupling surface 192 of the brake shoes 191 urges the brake shoes 191 and hence the annular bushing 172 and nut 164 through their keyed relationship to rotate in the first rotational direction. The nut 164 is also urged to rotate in this first direction by the torsion spring 174, which keeps the brake shoes 191 engaged with the pulley member 150 to drive the hub 140 and shaft 78. Rotation of the nut 164 in the first direction causes the nut 164 to translate axially along the axis of rotation 148 in the direction of arrow A via the threaded engagement with the hub 140. As the nut 164 translates axially in direction A as part of the braking assembly 200, the nut 164 acts to expand the annular bushing and brake shoes 191 radially outwardly such that the contact pressure and friction force between the brake shoes 191 and the pulley member 150 increases the frictional coupling between the nut 164 to the pulley member 150.

In a second operating condition, also referred to as an overrunning condition, the input shaft 78 disengages from the pulley member 150 and continues to rotate with momentum in the first rotational direction when the pulley member 150 experiences a relative torque reversal or sudden slowdown. In this condition, the pulley member 150 may continue to rotate in the first direction but with less angular velocity than the velocity at which it had been driving the input shaft 78. The sudden decrease of angular velocity at the pulley member 150 has the effect of a relative reversal of torque, which is translated from the pulley member 150 to the nut 164 through the brake assembly 200 via the previously described frictional engagements. If the rotational force, i.e., the application of torque to the nut 164, provided by the pulley member 150 during this second operating condition overcomes the spring force of the torsion spring 174, the nut 164 will rotate in a direction that causes the nut 164 to translate axially along the axis of rotation 148 in the direction of arrow B via the threaded engagement it has with the hub 140. As the nut 164 translates in the B direction, contact pressure and friction force between the brake shoes 191 and the pulley member 50 will decrease as a result of the contraction of the annular bushing 172, and if the nut translates far enough, the annular bushing 172 will contract inward to its non-expanded state, which will decouple the brake shoes 191 and therefore the hub 140 from the pulley member 150. Once decoupled the hub 140 and pulley member 150 rotate relative to one another with minimal friction such that the pulley member 150 rotates independently of the input shaft 78.

Referring to FIG. 7, in one embodiment, the pulley assembly 16' may include a rotation-preventing installation feature. This is beneficial because it stops the hub 140 from spinning with respect to the pulley member 150 during installation of the nut 164. The rotation-preventing installation feature includes a keyway 146 on the inner diameter of the bore 144 and one or more flats 145 on the outer diameter of the hub 140. The keyway 146 is engageable with a key 79 on the outer diameter of the alternator shaft (see FIG. 9). The flats 145 are shaped and oriented to receive a tool such as a wrench or pliers. Accordingly, the tool can grip the flats 145 to hold the hub 140 stationary, and respectively the shaft 78 because of their keyed relationship, so that the nut 164 can be threaded onto the outer threaded surface 166 of the hub 140.

Various parameters can affect the operation, responsiveness, and performance of the pulley assemblies 16, 16' including the angle of the frictional coupling surfaces relative to the axis of rotation, the coefficients of friction of the coupling surfaces, the torsion spring force, the thread pitch and count of the threaded connection between the hub and nut, and the coefficient of friction of the threaded connection. By significantly decreasing the acute angle formed between the frictional coupling surfaces and the axis of rotation, the new design provides very large clamping force and torque resistance through predominantly radial force with far less axial force. The reduction in axial load enables the threaded connection between the hub and nut to deactivate easier and more responsively to relative torque reversals. Optimization toward a target of 0 in-lb breakaway torque for overrunning is accomplished by selecting a combination of the parameters listed above. Other factors that affect the selection of a particular combination include wear, primary clutching, durability and cost.

What is claimed is:

1. A pulley assembly for use in an automobile accessory drive system, the pulley assembly comprising:
a shaft engaging hub including an axis of rotation, an outer threaded surface, and a bore for receiving an accessory input shaft for engagement therewith;
a pulley member including a bore that receives the shaft engaging hub, the pulley member including an inner coupling surface and an outer peripheral belt-engaging surface;
a nut including an inner threaded surface that is engaged with the outer threaded surface of the shaft engaging hub, the nut having a generally frustoconical outer surface opposite the inner threaded surface;
an annular bushing having the nut seated therein for rotation therewith; and
one or more brake shoes positioned around an outside of the annular bushing, the brake shoes having an outer coupling surface in frictional contact with the inner coupling surface of the pulley member;
wherein the nut is capable of axial translation relative to the annular bushing and the annular bushing is capable of expanding radially outward in response to the axial translation of the nut in a first direction.

2. The pulley assembly of claim 1, wherein the annular bushing includes a keyway and the nut includes a tab, wherein the tab is received in the keyway.

3. The pulley assembly of claim 1, wherein the annular bushing includes a plurality of panels forming a generally frustoconical ring, wherein each panel is separate from the two adjacent panels which defines slits therebetween.

4. The pulley assembly of claim 3, wherein inner surfaces of the panels include pockets recessed therein that are capable of receiving grease therein.

5. The pulley assembly of claim 3, wherein the panels include glass-filled nylon.

6. The pulley assembly of claim 3, wherein the annular bushing includes a plurality of spacers on an outer surface thereof, wherein two consecutive spacers and panel portions therebetween form a stand for receiving a brake shoe.

7. The pulley assembly of claim 1, wherein rotation of the nut in the first direction about the outer threaded surface of the shaft engaging hub couples the shaft engaging hub to the pulley member for rotation therewith, and rotation of the nut in a second direction opposite the first direction decouples the outer coupling surface of the brake shoes from the inner coupling surface of the pulley member such that the nut and shaft engaging hub rotate independently of the pulley member.

8. The pulley assembly of claim 1, wherein the frustoconical outer surface of the nut has an acute angle between approximately 5 and 45 degrees relative to the axis of rotation of the shaft engaging hub.

9. The pulley assembly of claim 1, wherein the outer coupling surface of the brake shoes comprise a brake material.

10. The pulley assembly of claim 1, further comprising a cover coupled to the shaft engaging hub for rotation therewith.

11. The pulley assembly of claim 10, further comprising an annular seal positioned between an inner annular surface of the bore of the pulley member and a portion of the cover, wherein a seal is formed between an inner surface of the annular seal and the portion of the cover.

12. The pulley assembly of claim 11, wherein the cover includes a generally plate shaped annular ring that extends over the annular seal such that the annular seal is protected.

13. The pulley assembly of claim 10, further comprising a torsion spring having a first end engaged with the cover and a second end engaged with the nut, the torsion spring biasing the nut to rotate in the first direction about the outer threaded surface of the shaft engaging hub.

14. The pulley assembly of claim 1, further comprising a bearing assembly having an inner race coupled to the shaft engaging hub and an outer race coupled to the pulley member to permit the shaft engaging hub to rotate relative to the pulley member.

15. The pulley assembly of claim 1, wherein the outer coupling surface of each brake shoe is parallel to the inner coupling surface of the pulley member and is non-parallel to an inner surface of the brake shoe as viewed in a longitudinal cross-section.

16. A method of manufacturing a pulley assembly for use in an automobile accessory drive system, the method comprising the steps of:
providing a shaft engaging hub including an axis of rotation, an outer threaded surface, and a bore for receiving an accessory input shaft for engagement therewith;
providing a pulley member including a bore that receives the shaft engaging hub, the pulley member including an inner coupling surface and an outer peripheral belt-engaging surface;
providing a nut including an inner threaded surface that is engaged with the outer threaded surface of the shaft engaging hub, the nut having a generally frustoconical outer surface opposite the inner threaded surface;
providing an annular bushing having the nut seated therein for rotation therewith;
providing one or more brake shoes positioned around an outside of the annular bushing, the brake shoes having an outer coupling surface in frictional contact with the inner coupling surface of the pulley member; and
selecting a thread pitch of the outer threaded surface of the hub, selecting a friction material for the outer coupling surface of the brake shoes, and selecting the angle of the frustoconical outer surface of the nut such that the pulley assembly is operable to engage and disengage the hub from the pulley member.

17. The method of claim 16, further comprising selecting the thread pitch, the friction material, and the angle to minimize the torque needed to disengage the hub from the pulley member for relative rotation.

18. The method of claim 16, further comprising selecting a coefficient of friction between the outer coupling surface of the brake shoes and the inner coupling surface of the pulley member.

19. The method of claim 16, wherein the annular bushing includes a plurality of panels forming a generally frustoconical ring, wherein each panel is separate from the two adjacent panels and define slits therebetween.

20. The method of claim 19, wherein the inner surfaces of the panels include pockets recessed therein that are capable of receiving grease therein, and further comprises applying grease to the inner surface of the panels to place grease in the pockets.

* * * * *